US006606229B2

(12) United States Patent
Takahashi et al.

(10) Patent No.: US 6,606,229 B2
(45) Date of Patent: Aug. 12, 2003

(54) HANDLE OPERATING MECHANISM IN CIRCUIT BREAKER

(75) Inventors: Tatsunori Takahashi, Saitama (JP); Yoshinobu Hamada, Saitama (JP); Naoshi Uchida, Saitama (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/970,585

(22) Filed: Oct. 4, 2001

(65) Prior Publication Data

US 2002/0092751 A1 Jul. 18, 2002

(30) Foreign Application Priority Data

Oct. 10, 2000 (JP) .................................... P. 2000-309073

(51) Int. Cl.[7] ............................................... H01M 73/00
(52) U.S. Cl. ........................ 361/115; 200/336; 200/501
(58) Field of Search .................. 361/115; 200/329–331, 200/336–338, 501

(56) References Cited

U.S. PATENT DOCUMENTS 2,441,808 A * 5/1948 Fry .......................... 200/11 G
3,592,892 A * 7/1971 Deltoer ..................... 200/16 D
3,970,808 A * 7/1976 Gryctko et al. .......... 200/50.15
4,002,088 A * 1/1977 Alsch ......................... 475/154
4,182,939 A * 1/1980 Feaster ..................... 200/17 R
4,795,867 A * 1/1989 Ohi et al. ................. 200/37 R
5,111,009 A * 5/1992 Chan et al. ................. 200/330
5,219,070 A * 6/1993 Grunert et al. ............. 200/330
6,515,526 B2 * 2/2003 Dairi .......................... 327/156

* cited by examiner

*Primary Examiner*—Adolf D. Berhane
*Assistant Examiner*—Gary L. Laxton
(74) *Attorney, Agent, or Firm*—Pearne & Gordon LLP

(57) ABSTRACT

In a slow-make type circuit breaker for opening and closing a main circuit contact in synchronism with the manual operation of a rotary operation handle, a ratchet unit 12 as an artificial quick-make means for forcibly increasing the operating force of the operation handle in the middle of a stroke for ON operation of the contact is constituted by a convex cam 11 made of metal and coupled with the operation handle 5, a ratchet 12*b* made of metal and disposed at a point close to an ON position of the operation handle so as to face the cam, a driving spring 12*c* for pressing the ratchet toward a rotary movement path of the cam, and a ratchet case 12*a* in which these parts are incorporated. The unit is fabricated inside a cover 1*b* of a circuit breaker body. Here, the cam and the ratchet are formed as common parts, and the driving spring is selected in accordance with the kind of circuit breaker.

6 Claims, 6 Drawing Sheets

HANDLE OPERATING MECHANISM IN CIRCUIT BREAKER

BACKGROUND OF THE INVENTION

1. Field of the Invention

The present invention relates to a handle operating mechanism in a circuit breaker equipped with a rotary operation handle, which is intended to be applied to a wiring molded-case breaker or the like.

2. Description of the Related Art

First, FIGS. 5 to 7 show a conventional configuration of a circuit breaker equipped with a rotary operation handle as mentioned above. First, in FIG. 5, the reference numeral 1 represents a body case of the circuit breaker, constituted by a lower case 1*a* and an upper cover 1*b*; 2, a breaking portion for a main circuit contact, incorporated in a bottom portion of the lower case 1*a*; 3, a contact switching mechanism portion for the breaking portion 2; 4, an overcurrent tripping device; 5, a rotary operation handle attached to the upper surface of the cover 1*b*; and 6, a gear mechanism for establishing linkage between the operation handle 5 and the contact switching mechanism portion 3.

Here, as shown in FIG. 6, the gear mechanism 6 is constituted by the combination of a rotary gear (driving gear) 8 connected to a shaft of the operation handle 5, and a toggle gear 9 having an axis perpendicular to that of the rotary gear 8 and attached to the contact switching mechanism portion 3. On the other hand, the contact switching mechanism portion 3 is constituted by a toggle link mechanism 3*a* linking with the toggle gear 9, a switch lever 3*c* urged by a main spring 3*b*, a latch mechanism, and so on. In addition, as shown in FIG. 7, the breaking portion 2 is constituted by a fixed contact 2*a*, a bridging movable contact 2*b*, a movable contact holder 2*c*, a contact spring 2*d*, an arc-suppressing plate 2*e*, and so on. The switch lever 3*c* faces the upper surface of the movable contact holder 2*c*. Incidentally, contacts corresponding to three phases are incorporated in the breaking portion 2, and movable contacts 2*b* and contact springs 2*d* for the respective phases R, S and T are mounted and supported in the movable contact holder 2*c* so as to be arrayed left and right.

In such a configuration, when the operation handle 5 is rotated from an OFF position to an ON position, the toggle link mechanism 3*a* pushes down the rear end of the switch lever 3*c* through the gear mechanism 6. As a result, the switch lever 3*c* rotates counterclockwise so as to store energy in the main spring 3*b*. In the breaking portion 2, the movable contact 2*b* urged by the contact spring 2*d* comes into contact with the fixed contact 2*a* so as to close the main circuit. On the contrary, when the operation handle 5 is rotated from the ON position to the OFF position, the toggle link mechanism 3*a* operates in a reverse direction to the above-mentioned one so as to release the switch lever 3*c* from restriction. As a result, the switch lever 3*c* is driven to rotate clockwise by the stored energy of the spring force of the main spring 3*b* to open the movable contact 2*b* through the contact holder 2*c*. Also when the latch mechanism of the contact switching mechanism portion 3 is released by the operation of the overcurrent tripping device 4 so as to carry out tripping, the main circuit contact is opened likewise. In this case, the operation handle 5 rotates from the ON position and stops in a TRIP display position.

In addition, FIGS. 8A and 8B are diagrams showing a conventional structure of the handle operating mechanism of the above-mentioned circuit breaker. The rotary gear 8 has teeth 8*a* gearing with the toggle gear 9 and is coupled with a shaft 5*a* of the operation handle 5, so that the shaft 5*a* is fit into the rotary gear 8. On the other hand, the toggle gear 9 is attached to the contact switching mechanism portion 3 so that the axis of the toggle gear 9 crosses the axis of the rotary gear 8 at right angles. Thus, the toggle gear 9 is linked with the above-mentioned toggle link mechanism so that the teeth of the toggle gear 9 gear with the teeth 8*a* of the rotary gear 8. Incidentally, the reference numeral 10 represents a return spring for urging the operation handle 5 toward the OFF position.

In the slow-make type circuit breaker as described above, the contact switching mechanism portion 3 is driven synchronously with the manual operation of the rotary operation handle 5 so as to open and close the main circuit contact. In such a slow-make type circuit breaker, particularly if the handle is rotated slowly toward the ON position at the time of operation to make the contact, there may occur a slight temporal gap among the respective phases in the timing with which the movable contact comes into contact with the fixed contact. Thus, there is a fear that the temporal gap causes an obstacle to start-up control of an electric motor or the like. In order to avoid such a disadvantage so as to close the contacts in the respective phases at the same timing, it is necessary for an operator to carry out an operation to rotate the operation handle at a high speed at the time of make of the circuit breaker.

On the other hand, as artificial quick-make means for forcibly increase the operating speed of the handle at the time of contact make of the circuit breaker, there has been hitherto developed a circuit breaker with an interrupt mechanism such as a cam type one in which an operation handle is passed through while the operating force acting on the operation handle is forcibly increased in the middle of a make stroke of the handle. In such a circuit breaker, there has been a drawback in durability or reliability because such an artificial quick-make function is lost before the circuit breaker body reaches its switch life of number of times.

SUMMARY OF THE INVENTION

It is therefore an object of the present invention to provide a handle operating mechanism in a circuit breaker in which artificial quick-make means for forcibly increasing the operating speed of a handle at the time of contact make is constituted by a mechanism which is excellent in reliability and durability and exhibits effects on assembling performance and unification of parts.

In order to achieve the above object, according to the present invention, there is provided a handle operating mechanism in a circuit breaker equipped with a rotary operation handle for driving a contact switching mechanism in synchronism with manual operation to thereby open/close a main circuit contact, wherein a ratchet unit is provided as artificial quick-make means for forcibly increasing operating force of the operation handle in the middle of a make stroke for ON-operation of the contact, the ratchet unit being constituted by a convex cam which is synchronously gearing with the operation handle, a ratchet which is disposed at a point close to an ON position of the operation handle so as to be lateral to a rotary movement path of the cam, and a driving spring which presses a claw portion of the ratchet from behind so as to thrust the claw portion toward a movement locus of the cam. Specifically, the ratchet unit is configured in the following modes.

Preferably, the cam and the ratchet are made of metal which is high in abrasion resistance.

Preferably, the ratchet is a lever which is pivotally supported at one end thereof and in which a convex claw portion and a seat for the driving spring are formed at a forward end side of the lever, and the ratchet is disposed in tensile claw relationship with a moving direction of the cam at the time of ON-operation of the handle.

Preferably, the ratchet and the driving spring are incorporated in a discrete ratchet case, and the ratchet case is fabricated inside a case cover of a circuit breaker body.

Preferably, a bearing hole of a ratchet spindle formed in the ratchet case is formed into a long hole, and the ratchet receives pressure force of the cam at the time of OFF-operation of the operation handle so as to retreat along the long hole.

Preferably, the cam and the ratchet are formed as common parts, and spring force of the driving spring is set in accordance with another kind of circuit breaker different in rating.

In the above-mentioned configuration, when the operation handle is rotated from an OFF position to an ON position at the time of make of the circuit breaker, in the middle of the rotation, the cam linking with the operation handle abuts against the ratchet urged by the spring so as to receive resistance force (braking force). Here, when operating force acting on the handle is increased so that the cam thrusts the ratchet away to thereby get over the ratchet, the resistance force acting on the operation handle disappears so that the handle becomes light suddenly. Consequently, the operation handle rotates quickly at a dash to the ON position. In synchronism with this handle operating speed, the contact switching mechanism portion operates to close the main circuit contacts for the respective phases in accordance with the contact timing.

In this case, when the cam and the ratchet are made of metal which is high in abrasion resistance, the durability is improved and there is no fear that an artificial quick-make function is lost before the circuit breaker reaches its switch life of number of times. Thus, the reliability is improved. In addition, when the ratchet mechanism is formed into a unit and fabricated in a case of a circuit breaker body, while the driving spring is combined in accordance with another kind of circuit breaker different in rated current, the assembling performance can be improved, and unification of the parts can be attained.

Further, when the bearing hole of the ratchet spindle formed in the ratchet case is formed into a long hole so that the ratchet receives pressure force of the cam at the time of OFF-operation of the operation handle so as to retreat along the long hole, the operation handle passes through the ratchet mechanism without suffering large resistance force from the ratchet mechanism at the time of OFF-operation of the circuit breaker. Thus, the operation handle can be rotated to the OFF position easily with comparatively light force.

BRIEF DESCRIPTION OF THE DRAWINGS

FIGS. 3A to 3C are explanatory views of an artificial quick-make action according to the configuration of FIG. 1, in which FIG. 3A is a view showing a state in which an operation handle is in an OFF position, FIG. 3B is a view showing a state in which the operation handle is passing through a ratchet, and FIG. 3C is a view showing a state in which the operation handle is in an ON position, respectively;

FIGS. 8A and 8B are construction views of a handle operating mechanism in FIG. 5, in which FIG. 8A is a perspective view showing the assembled state, and FIG. 8B is an exploded perspective view of some parts in FIG. 8A, respectively.

DETAILED DESCRIPTION OF THE PREFERRED EMBODIMENTS

Figure 1:
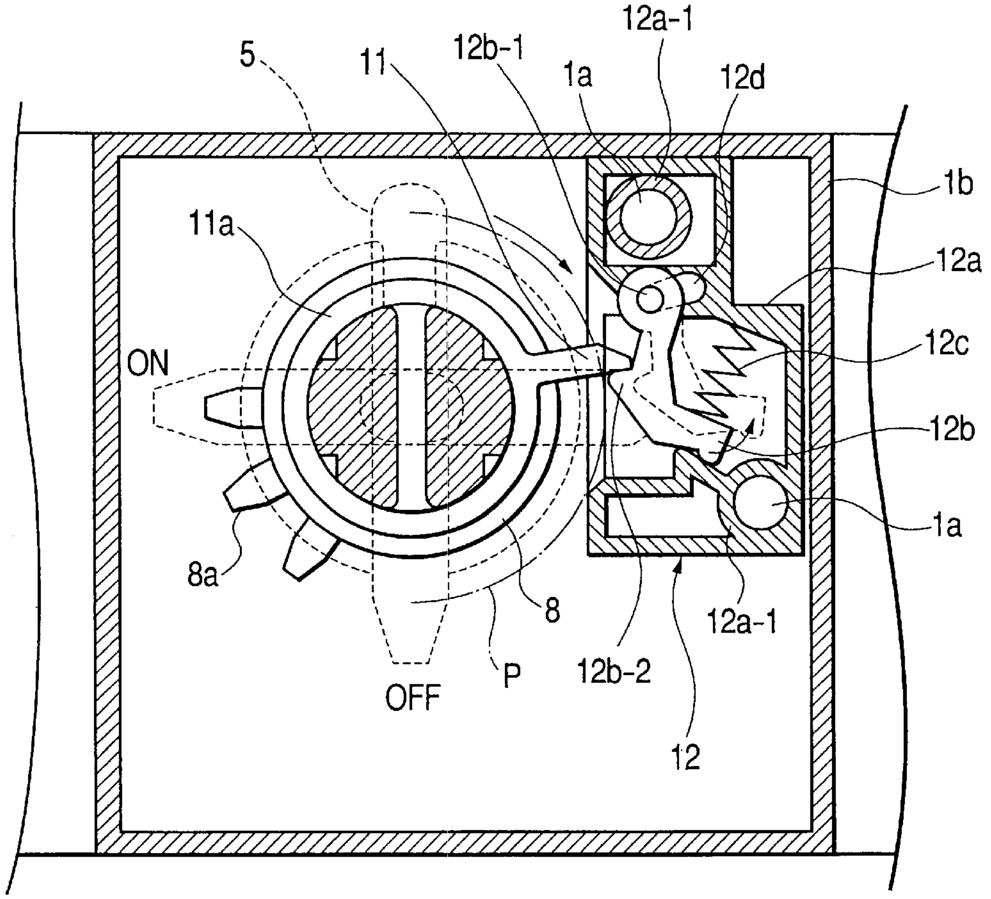
FIG. 1 is a cross-sectional plan view of an upper portion of a circuit breaker showing a main portion structure of a handle operating mechanism according to an embodiment of the present invention.
Figure 2:
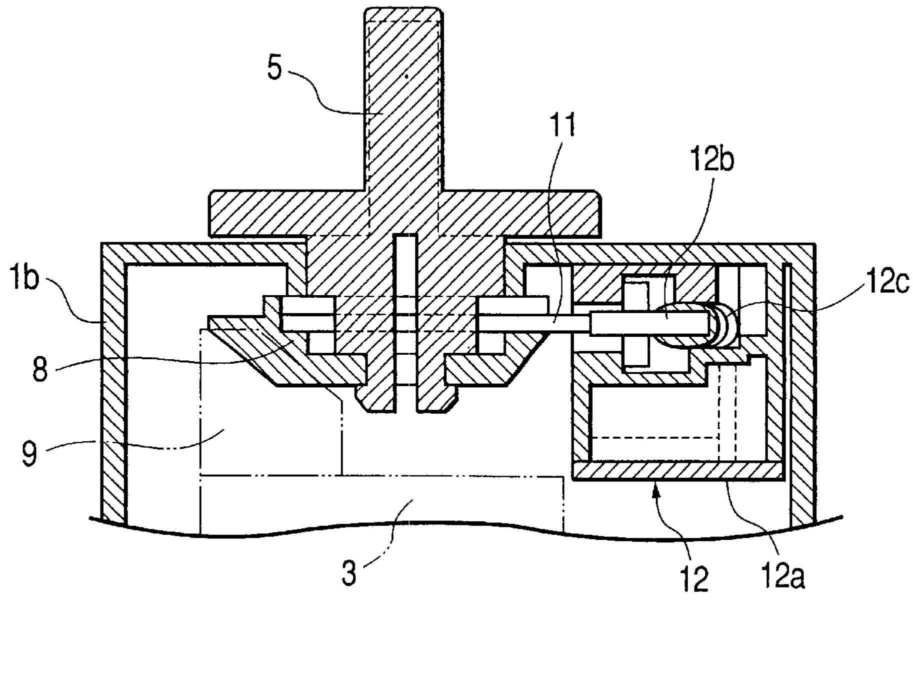
FIG. 2 is a vertically sectional view of FIG. 1.

A description will be described in more detail of preferred embodiments of the invention with reference to FIGS. 1 to 4. Incidentally, in the drawings of embodiment, members similar to those in FIGS. 5 to 8 are referenced correspondingly, and detailed description thereof will be omitted.

That is, in the illustrated embodiment, a ring member 11*a* made of metal high in abrasion resistance and having a convex cam 11 projecting over the circumference is coupled with the shaft portion of a rotary operation handle 5. Further, a ratchet unit 12 constituting artificial quick-make means in cooperation with the convex cam 11 is provided in an internal corner of a case cover 1*b* of a circuit breaker body.

Figure 3A:
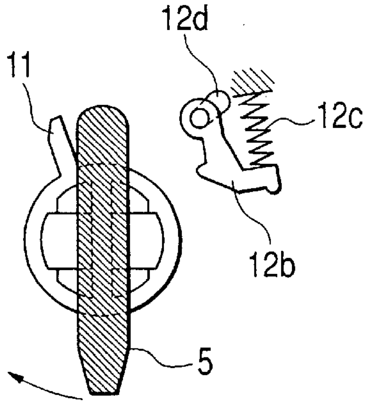
Figure 3B:
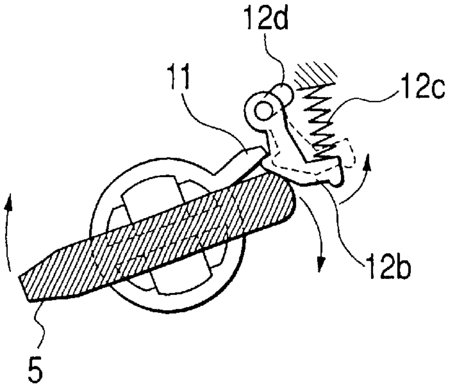
Figure 3C:
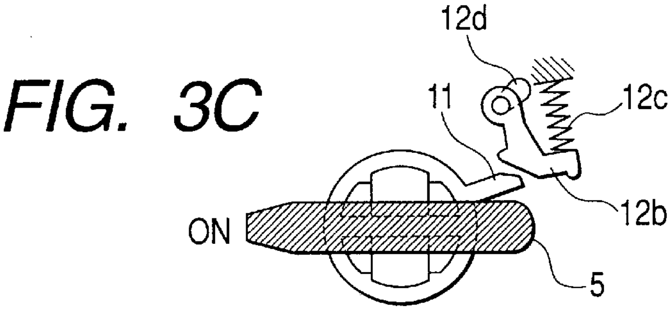

Here, the ring member 11*a* is coupled with the operation handle 5 so that the convex cam 11 is located slightly out of phase alignment with the grip of the operation handle 5 so as to be delayed (see FIGS. 3A to 3C). The operation handle 5 is positioned as follows. That is, in a make stroke of the circuit breaker in which the operation handle 5 is rotated from an OFF position to an ON position as illustrated, the convex cam 11 is positioned to interfere with the ratchet unit 12, as will be described later, before the operation handle 5 reaches the ON position.

On the other hand, the ratchet unit 12 is formed into an assembly in which a ratchet 12*b* and a driving spring 12*c* are fabricated in a ratchet case 12*a* which is formed as a discrete part. Cylindrical support portions 12*a*-1 formed in opposite ends of the ratchet case 12*a* are pressed into struts 1*a* provided to project in the inner surface of the case cover 1*b* of the circuit breaker body. Thus, the ratchet unit 12 is removably fixed and fabricated in a predetermined position.

In addition, the ratchet 12*b* is formed as a lever made of metal. That is, the rear end of the ratchet 12*b* is pivotally supported, through a spindle 12*b*-1, by a bearing hole 12*d* formed in the ratchet case 12*a*. On the other hand, a convex claw portion 12*b*-2 projecting toward the cam 11 is formed between the rear end of the lever and a seat for a driving spring 12*c* which is formed at the forward end side of the lever. The claw portion 12*b*-2 receives spring force of the driving spring (helical compression spring) 12*c* hung between the spring seat and the ratchet case 12*a*. Thus, the claw portion 12*b*-2 thrusts toward a movement path (movement locus P) of the convex cam 11 rotating in synchronism with the operation handle 5. Incidentally, the ratchet 12*b* is disposed in tensile claw relationship using the spindle 12*b*-1 at the rear end as a fulcrum with respect to the moving direction of the cam 11 at the time of ON-operation of the handle. Further, the bearing hole 12*d* for pivotally supporting the spindle 12*b*-1 of the ratchet 12*b* is formed into a long arc hole in which the spindle 12*b*-1 can move back with the forward end of the ratchet 12*b* as a fulcrum.

Next, the artificial quick-make action of the circuit breaker based on the ratchet unit 12 configured thus will be described with reference to FIGS. 3A to 3C and FIG. 4. First, FIG. 3A shows the OFF state of the circuit breaker in which the operation handle 5 stops in the OFF position. When the operation handle 5 is manually rotated from this position to the ON position for the purpose of make of the circuit breaker, the convex cam 11 rotates in synchronism with the handle. When the operation handle 5 rotates to the position shown in FIG. 3B in the middle of the make stroke, the forward end of the convex cam 11 abuts against the claw portion 12*b*-2 of the ratchet 12*b* thrust and urged from behind by the spring force of the driving spring 12*c*, so that the operation handle 5 suffers large resistance force (braking force) in this position. Therefore, if an operator increases the operating force to rotate the operation handle 5 against the braking force, the torque acting on the convex cam 11 allows the ratchet 12*b* to compress the driving spring 12*c* while oscillating counterclockwise with the spindle 12*b*-1 as a fulcrum. Thus, the claw portion 12*b*-2 retreats so that the convex cam 11 gets over the ratchet 12*b* and goes forward. Here, when the convex cam 11 has got over the claw portion 12*b*-2 of the ratchet 12*b*, the resistance force applied so far from the ratchet mechanism disappears. Thus, the operation handle 5 is moved quickly at a dash to the ON position by the operating force applied at that time. In synchronism with this handle operation, the contact switching mechanism portion 3 operates as described with reference to FIGS. 6 and 7, to vigorously close the main circuit contacts of the breaking portion 2 through the switch lever 3*b*.

Figure 4:
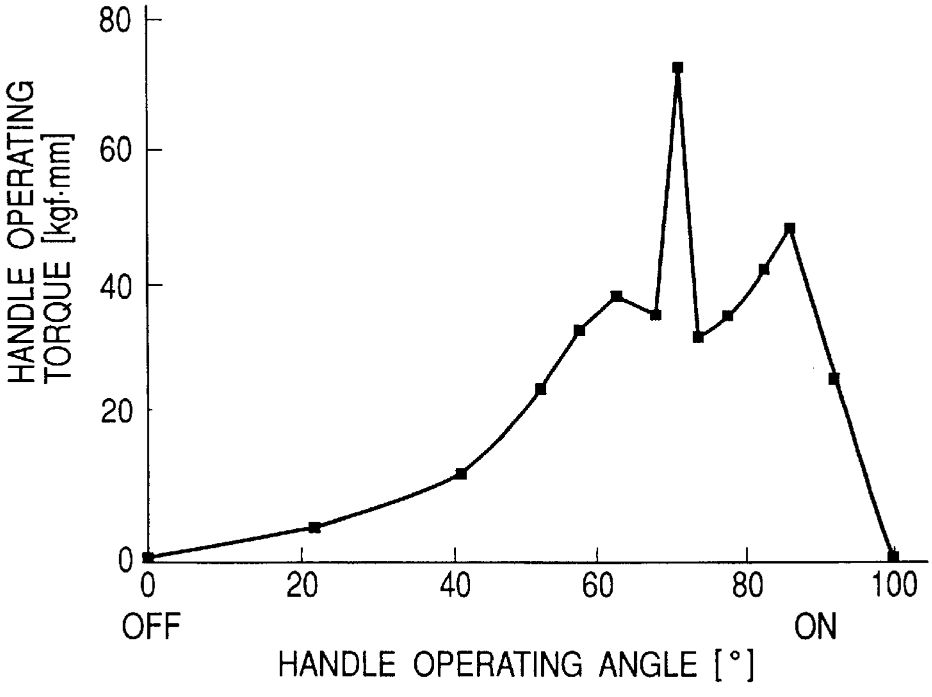
FIG. 4 is a graph showing the relationship between the handle operating angle and the handle operating torque corresponding to the operation in FIGS. 3A to 3C.
Figure 5:
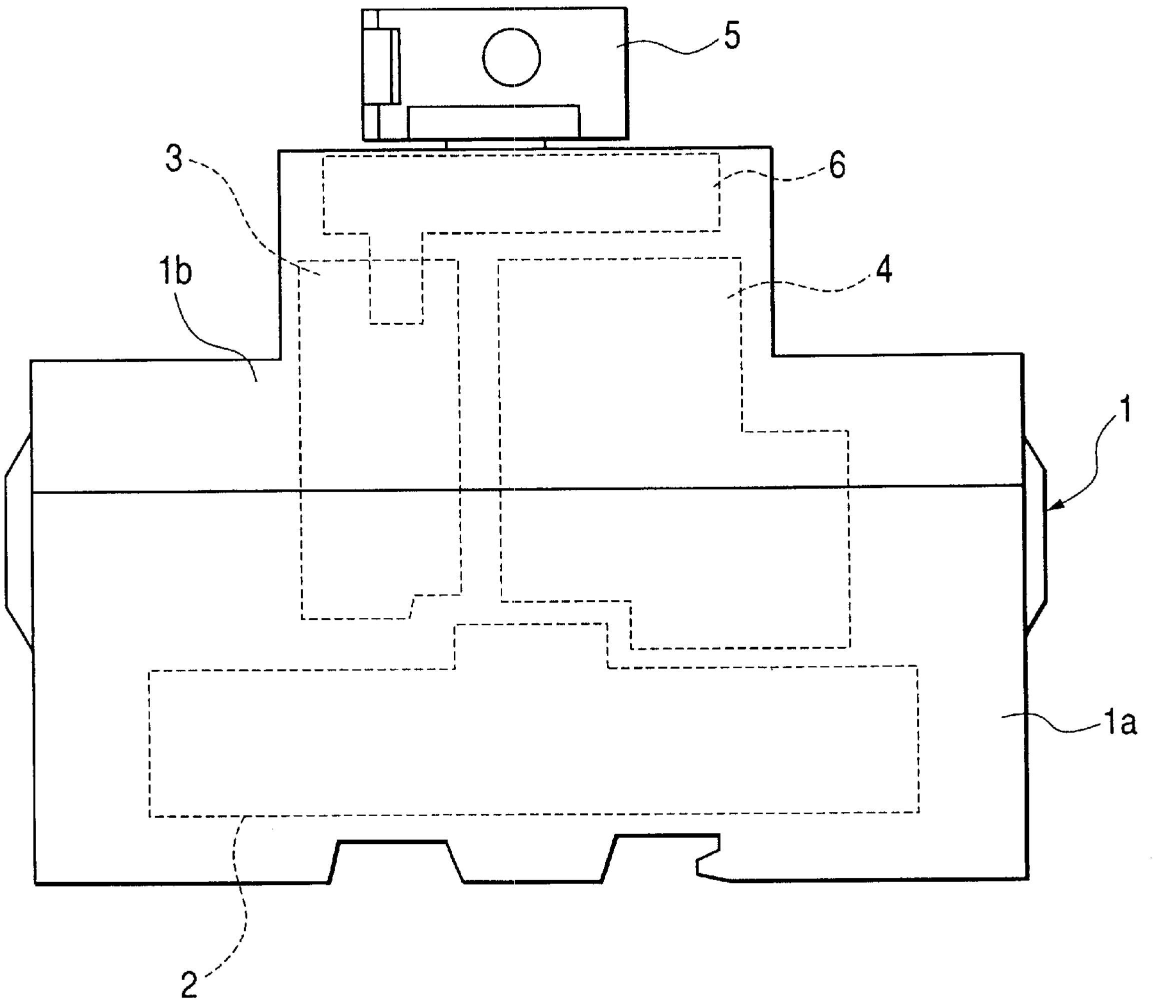
FIG. 5 PRIOR ART
FIG. 5 is a schematic construction view of a circuit breaker to which the present invention is intended to be applied.
Figure 6:
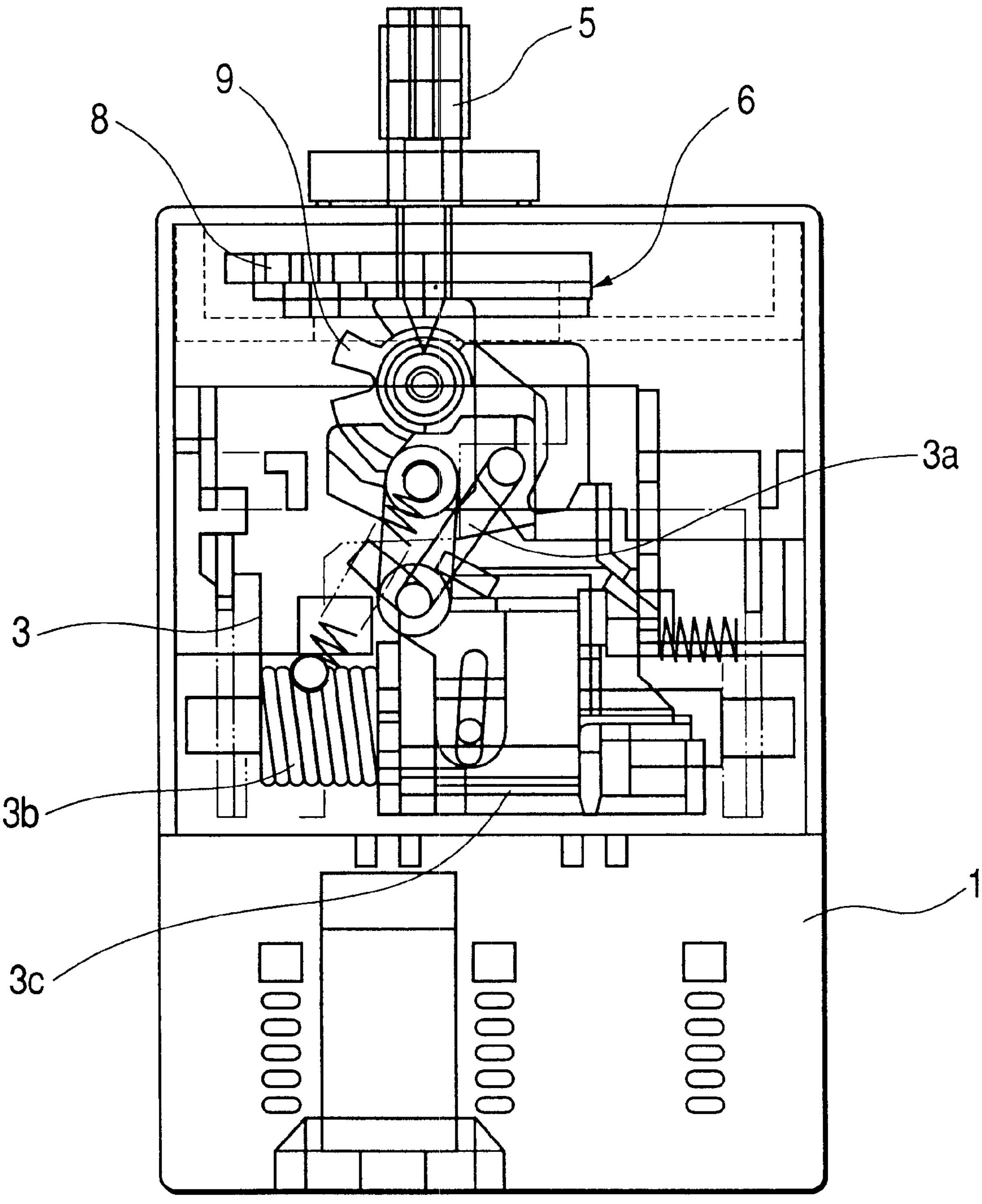
FIG. 6 PRIOR ART
FIG. 6 is a view showing the internal structure of a contact switching mechanism portion in FIG. 5.
Figure 7:
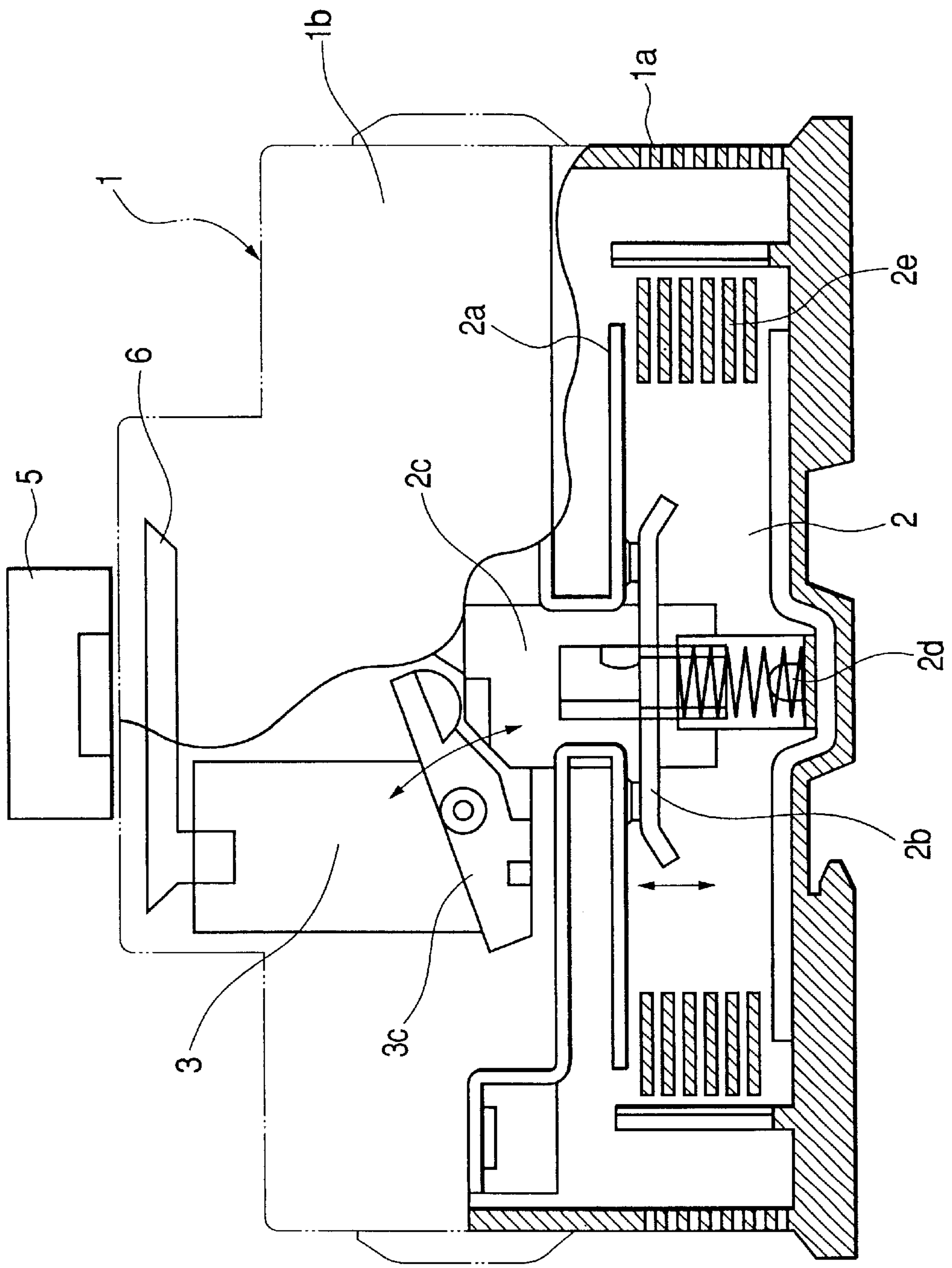
FIG. 7 PRIOR ART
FIG. 7 is a view showing the internal structure of a contact breaking portion in FIG. 5.
Figure 8A:
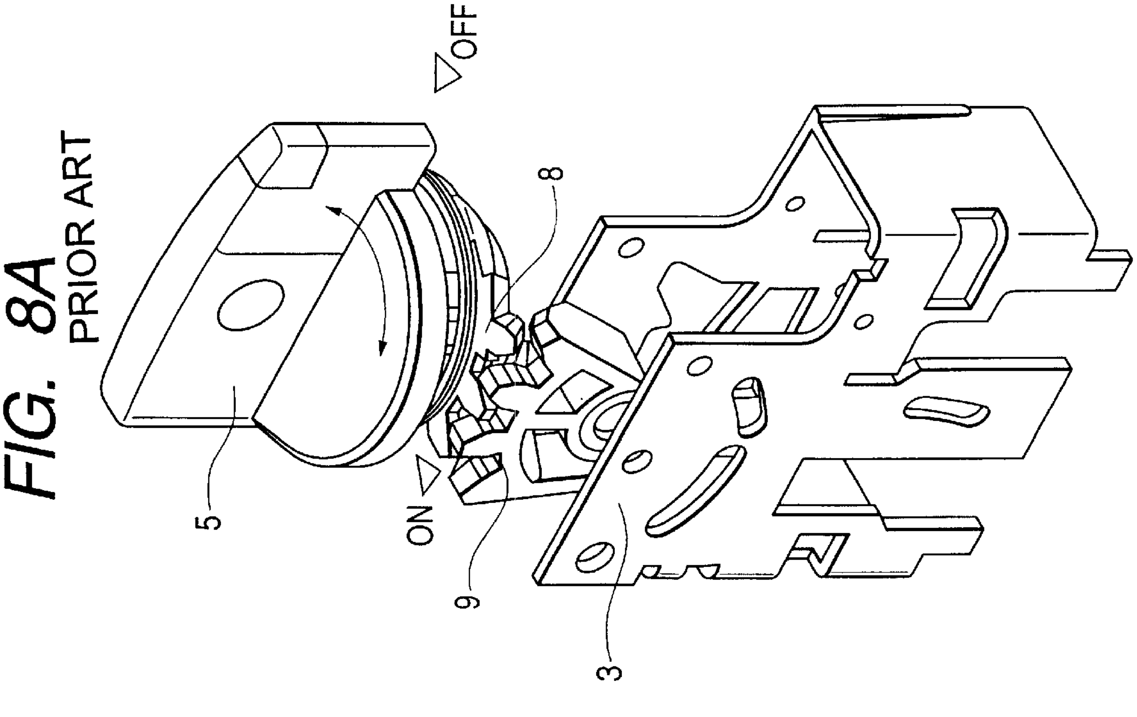
FIG. 8A PRIOR ART
Figure 8B:
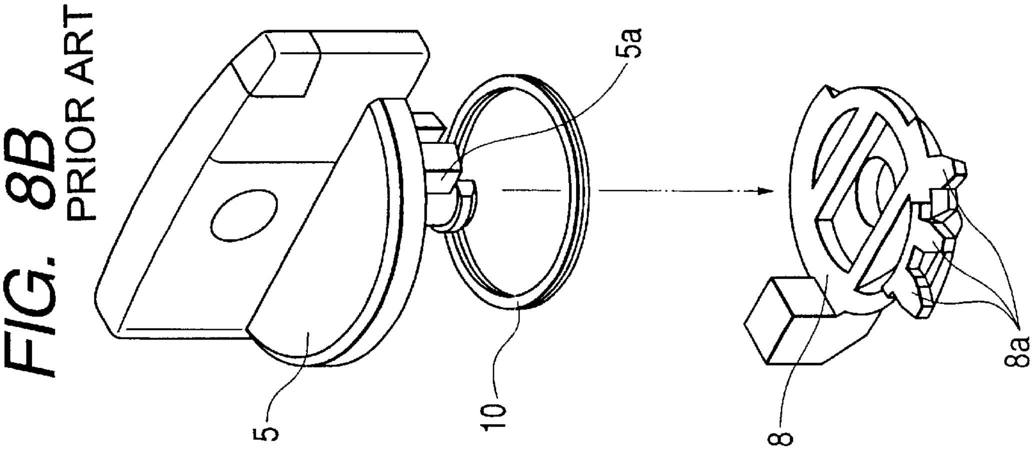
FIG. 8B PRIOR ART

FIG. 4 is a graph showing experimental values of handle operating force at the time of make operation by the above-mentioned artificial quick-make. In FIG. 4, the abscissa designates the handle operating angle between the OFF position as a starting point and the ON position, and the ordinate designates the handle operating torque. As is understood from this graph, maximum torque is produced when the convex cam 11 is getting over the ratchet 12*b*, and the operation handle goes forward to the ON position at a dash when the convex cam 11 has got over the ratchet.

Incidentally, when the operation handle 5 is rotated from the ON position to the OFF position so as to open the circuit breaker, the following stroke is pursued on the contrary to the above-mentioned make stroke. That is, the convex cam 11 rotates counterclockwise in synchronism with the operation handle 5. When the convex cam 11 abuts against the claw portion 12*b*-2 of the ratchet 12*b* to push the claw portion 12*b*-2 in the middle of the stroke, the spindle 12*b*-1 of the ratchet 12*b* retreats in the right direction along the bearing long hole 12*d* by use the spring seat at the forward end as a fulcrum. As a result, the convex cam 11 and hence the operation handle 5 get over the ratchet 12*b* without suffering large resistance force from the ratchet mechanism to reach the ON position. Thus, the OFF operation of the handle can be performed easily without applying large force to the handle.

In addition, in the above-mentioned ratchet unit 12, the ratchet case 12*a* and the ratchet 12*b* are arranged as common parts in order to commonize the parts, and the spring intensity of the driving spring 12*c* is chosen in accordance with the specification (frame size) of the circuit breaker. Thus, kinds of circuit breaker different in rating can be cope with by changing only the driving spring 12.

As described above, according to the configuration of the present invention, artificial quick-make means for forcibly increasing the operating force of an operation handle in the middle of a make stroke for ON-operation of a contact is constituted by a ratchet unit. The ratchet unit is constituted by a convex cam synchronously gearing with the operation handle, a ratchet disposed at a point close to an ON position of the operation handle so as to be lateral to a rotary movement path of the cam, and a driving spring for pressing a claw portion of the ratchet from behind so as to thrust the claw portion toward a movement locus of the cam. Accordingly, for a slow-make type circuit breaker, a stable artificial quick-make function can be provided at the time of make operation by means of a simple mechanism. Thus, the circuit breaker can be operated by a handle.

Further, when the cam and the ratchet are made of metal which is high in abrasion resistance, the durability is improved and there is no fear that an artificial quick-make function is lost before the circuit breaker reaches its switch life of number of times. Thus, the reliability is improved.

In addition, when the ratchet mechanism is formed into a unit and fabricated in a case of a circuit breaker body while the driving spring is combined in accordance with another kind of circuit breaker different in rated current, the assembling performance can be improved, and unification of the parts can be attained.

Further, when the bearing hole of the ratchet spindle formed in the ratchet case is formed into a long hole so that the ratchet receives pressure force of the cam at the time of OFF-operation of the operation handle so as to retreat along the long hole, the operation handle can be rotated to the OFF position easily with comparatively light force at the time of OFF operation of the circuit breaker.

What is claimed is:

1. A handle operating mechanism in a circuit breaker equipped with a rotary operation handle for driving a contact switching mechanism in synchronism with manual operation to thereby open/close a main circuit contact, said handle operating mechanism comprising:

a ratchet unit provided as artificial quick-make means for forcibly increasing operating force of said operation handle in the middle of a stroke for ON-operation of said contact, said ratchet unit comprising a convex cam which is synchronously gearing with said operation handle, a ratchet which is disposed at a point close to an ON position of said operation handle so as to be lateral to a rotary movement path of said cam, and a driving spring which presses a claw portion of said ratchet from behind so as to thrust said claw portion toward a movement locus of said cam.

2. A handle operating mechanism in a circuit breaker according to claim 1, wherein said cam and said ratchet are made of metal which is high in abrasion resistance.

3. A handle operating mechanism in a circuit breaker according to claim 1, wherein said ratchet comprises a lever which is pivotally supported at one end thereof and in which a convex claw portion and a seat for said driving spring are formed at a forward end side of said lever, and said ratchet is disposed in tensile claw relationship with a moving direction of said cam at the time of ON-operation of said handle.

4. A handle operating mechanism in a circuit breaker according to claim 1, wherein said ratchet and said driving spring are incorporated in a discrete ratchet case, and said ratchet case is fabricated inside a case cover of a circuit breaker body.

5. A handle operating mechanism in a circuit breaker according to claim 4, wherein a bearing hole of a ratchet spindle formed in said ratchet case is formed into a long hole, and said ratchet receives pressure force of said cam at the time of OFF-operation of said operation handle so as to retreat along said long hole.

6. A handle operating mechanism in a circuit breaker according to claim 1, wherein said cam and said ratchet are formed as common parts, and spring force of said driving spring is set in accordance with another kind of circuit breaker different in rating.

* * * * *